United States Patent Office 3,275,107
Patented Sept. 27, 1966

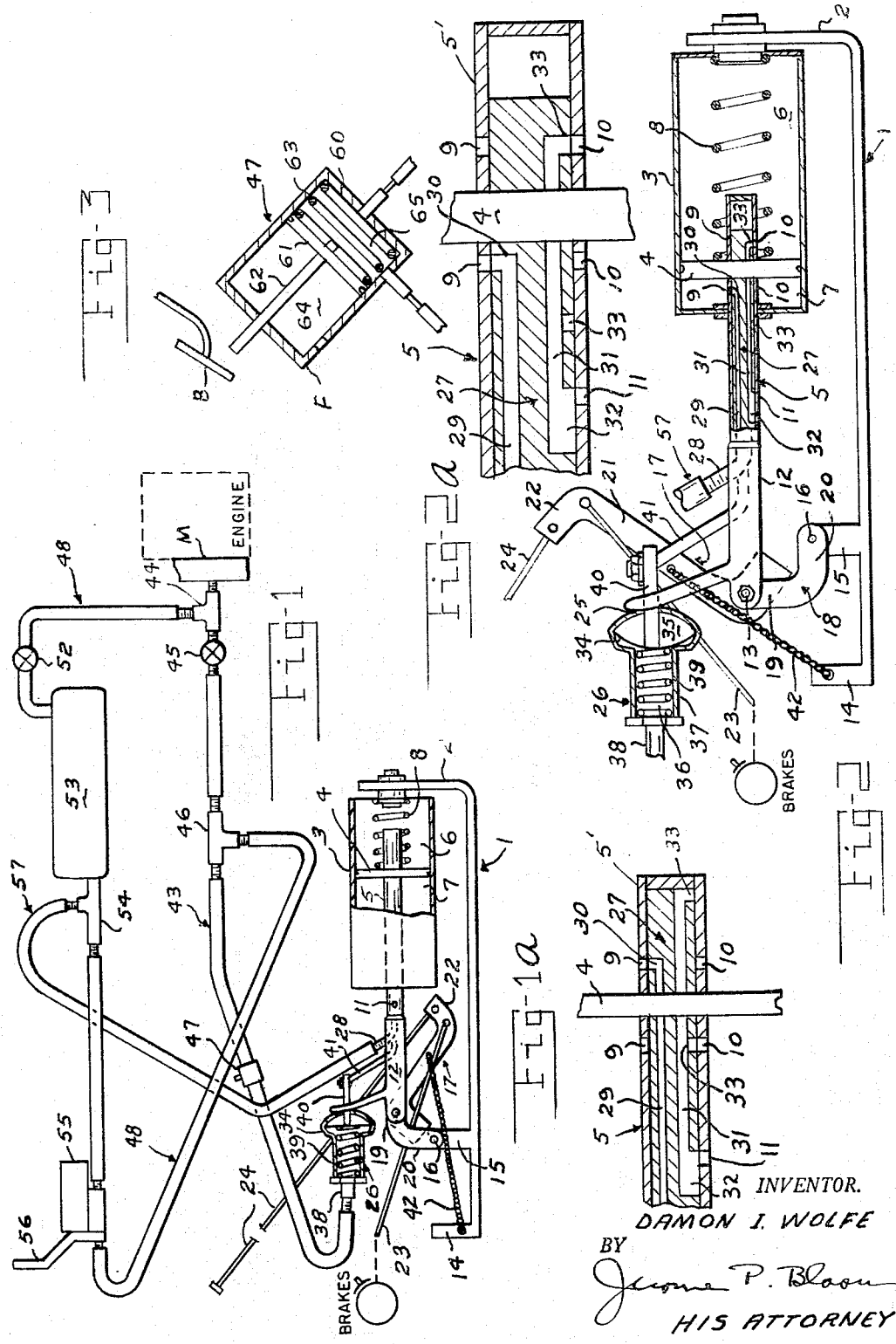

3,275,107
AUTOMATIC EMERGENCY BRAKING SYSTEM RESPONSIVE TO MOTOR CONTROL
Damon I. Wolfe, 219 W. Main St., West Carrollton, Ohio
Filed June 17, 1960, Ser. No. 36,892
13 Claims. (Cl. 192—3)

This invention relates to a novel automatic emergency braking system. It is particularly advantageous in application to automotive vehicles and will be so described. However, it should be readily obvious therefrom to those versed in the art that the application and embodiment of the invention is not so limited and such is not intended.

Most automotive vehicles employ an emergency brake which is hand controlled. In instance of use an operating handle available at the dash board must be reached, grasped and pulled in order to set the brake. This does not provide optimum safety since a hand controlled emeregency brake tends to be impositive in character. Moreover, many times it is inadequate for emergencies, due to both human and mechanical factors.

The present invention affords improvements in the art by providing an emergency braking system for power driven units which minimizes the human factor. This system, as applied to automotive vehicles, is designed to produce an automatic braking function in response to turning off the ignition switch to cut the engine in the vehicle in which it is employed. Means are also provided in accordance with the invention, whereby in the alternative the braking function may be effected by application of the conventional brake pedal in the vehicle. Thus, the invention can provide an automatic emergency braking action which is simultaneous with and supplemental to that effected in a vehicle by application of the brake pedal.

A primary object of the invention is to provide an emergency brake system for power driven units which is particularly advantageous in application to automotive vehicles and which may be economically manufactured, more efficient and satisfactory in use, adaptable to a wide variety of applications and unlikely to malfunction.

A further object is to provide emergency brake apparatus which is simple, effective and automatic in character.

Another object of the invention is to provide automatic braking apparatus particularly applicable to automotive vehicles which is rendered inoperative under the influence of applied vacuum and rendered operative in absence thereof.

An additional object of the invention is to provide emergency braking apparatus which may be readily connected into the intake manifold of an engine in a vehicle such as an automobile.

A further object of the invention is to provide an improved emergency brake system which is supplemental to and operable simultaneously with the conventional brake system in a self propelled vehicle.

A further object of the invention is to provide a vacuum controlled emergency braking system having means for overriding its normal operation.

An additional object of the invention is to provide automatic emergency braking apparatus possessing the advantageous structural features, the inherent meritorious characteristics and the means and mode of operation herein described.

With the above primary and other incidental objects in view which more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein preferred but not necessarily the only forms of embodiment of the invention are shown, FIG. 1 is a generally schematic view of an emergency brake system in accordance with the invention and FIG. 1a a detail;

FIG. 2 is an enlarged fragmentary view of the system shown in FIG. 1 and FIG. 2a a detail thereof; and FIG. 3 is a fragmentary view illustrating a modification of the system shown in FIG. 1.

The invention can be best described with reference to the embodiment shown in the accompanying drawings. The invention system is illustated in application to an automobile having an internal combustion engine. It includes a base plate 1 suitably anchored to the automobile frame, preferably adjacent its transmission. A vertical projection 2 to one end of the plate 1 resiliently mounts one end of a cylindrical housing 3. Any suitable means may be employed to mount the housing as long as it permits damped, vertical and relative pivoting movement thereof with respect to the projection 2 and normally positions the housing over and generally parallel to the plate 1.

A piston 4 mounts in the housing 3 about one end of a tubular rod 5 which projects therethrough. The tube 5 bears in the end of housing 3 remote from the projection 2 and extends outwardly therefrom. The piston 4 has a flexible seal about its periphery which bears on the inner wall of the housing 3 and defines relatively sealed chambers 6 and 7 therein to either side thereof. The chamber 6 is to the side of the piston adjacent the projection 2 while the chamber 7 is remote therefrom. A coil spring 8 in the chamber 6 biases the piston 4 towards the center of the housing 3 and from its end adjacent the projection 2.

The tubular rod 5, which extends through the chamber 7, has a portion 5' projecting slightly beyond the piston 4 and into the chamber 6. Suitable seals are provided between the housing and the rod 5 and the piston and the rod 5 to prevent leakage from the housing and between the chambers 6 and 7. Also, the innermost end of rod 5 in chamber 6 is closed for purposes to be further described.

The tube 5 has diametrically opposed slots 9 and 10 therein to either side of the piston 4 and adjacent thereto. It also has an aperture 11 in its projected extremity relatively adjacent a rod extension 12. The extension 12 is bifurcated to provide laterally spaced arms which are connected by a pivot pin 13. The pin 13 lies in a plane generally parallel to the plate 1 and remote from the projection 2.

The end of plate 1 remote from the projection 2 has a channel member 14 projecting vertically thereof. A plate 15 is also projected vertically of the plate 1 in a position adjacent and spaced from the member 14. A pivot pin 16 projects laterally of the plate 15 across the plate 1 and in a position below and parallel to the pin 13. As may be seen from the drawings, the pin 13 is above and spaced intermediately of the member 14 and the plate 15 in the brake release position shown in FIG. 2.

A crank lever 17 is provided which is of a compound character. Its lower portion 18 is generally arcuate and has one end 19 pivoted on the pin 13 while its other end 20 is pivoted on the pin 16. The upper portion 21 of the lever 17 is in the form of a generally rectangular narrow plate having its lower end connected to one side of the upper end 19 of the lever portion 18 and receiving the pivot pin 13 therethrough. In its brake release position, the portion 21 of the lever 17 is positioned to incline upwardly from the pin 13 in the direction of the projection 2 and over the bifurcation 12. The upper extremity of the lever portion 21 has a right angled lateral extension 22 from its side remote from the projection 2. A rod 23 is pivotally connected at one end of the upper end of portion 21 and extends rearwardly thereof in a direction away from the projection 2 to have its other end operatively connect to the conventional brake cables in the automobile in which the invention system is incorporated. A further cable 24 is connected to the extension 22 and extends rearwardly thereof for purposes to be further described.

A pair of support arms 25 integral with the upper surfaces of the bifurcated portions of rod extension 12 are positioned adjacent and upwardly and rearwardly inclined over the pin 13 to either side of the lever portion 21. The upper extremities of the arms 25 are fixed to the dome shaped end of a booster housing 26 to support this housing in a position generally parallel to the tubular rod 5.

A rod 27 bears in the tubular rod 5 to have one end adjacent the innermost end thereof and its other end extend outwardly between the bifurcations of the extension 12. The outermost end 28 of the rod 27 is inclined upwardly and away from the housing 3.

Two passages are provided longitudinally of and within the rod 27. One passage 29 opens to one end at the upwardly inclined end of rod 27 and extends inwardly to a point spaced from its innermost end. A lateral opening 30 in the rod 27 communicates with the innermost end of the passage 29. The opening 30 is adapted to selectively communicate with the slots 9 in the tubular rod 5 to either side of piston 4 in a manner to be further described. The second passage 31 extends between a single elongated lateral opening 32 and a pair of longitudinally spaced openings 33 in the side of rod 27 diametrically opposite the side containing the opening 30. The openings 32 and 33 are respectively positioned adjacent and inwardly from the rod portion 28 and immediately adjacent the innermost extremity of the rod 27, spaced to either side of opening 30.

The openings 33 are adapted to selectively communicate with the slots 10 in the tubular rod 5 while the opening 32 is elongated so that in any instance it will remain in communication with the aperture 11 in the rod 5 in the example illustrated in the drawings.

The housing 26 previously referred to has a flexible diaphragm 34 therein dividing its dome shaped extremity into an outer chamber 35 which is sealed thereby and an inner chamber 36 which has a cylindrical extension 37 to its end remote from the diaphragm 34. A tubular adapter 38 defines an opening to the chamber 36 to its end opposite the diaphragm 34. Coil spring 39 interposed in chamber 36 centers the diaphragm 34 in the dome shaped portion of the housing 26 and applied a bias thereof toward the chamber 35. A control rod 40 connects to and extends from the center of the diaphragm 34 through chamber 35 and the center of the dome shaped extremity of the housing 26. Proper seals are provided to insure a seal of the chamber 35. The projected end of the control rod 40 has an aperture which receives the upper end of a rod 41, the lower end of which is oriented parallel to the rod 40 and welded to the upwardly inclined projected end of the rod 27. The rods 40 and 41 are suitably fixed at their connected portions for conjoint movement as will be further described.

A spring 42 is connected at one end to a pin intermediate the ends of lever portion 21 and at its other end to the channel member 14 at the plate 1. In the brake release condition of the system shown in FIG. 2 of the drawings, the spring 42 is positioned to the left of the pin 13 in an over-center position relative thereto to bias the lever 17 counter-clockwise and establish rod 23 in a brake release position.

A main vacuum line 43 is shown to connect the engine intake manifold M of the automobile with adaptor 38 of the housing 26. A T-shaped connector 44, a check valve 45, a T-shaped connector 46 and a normally open shut off valve 47 are successively interposed in the line 43 between the intake manifold M and the housing 26.

An auxiliary vacuum line 48 connects into line 43 at the connector 44 to one end and into connector 46 at its other end. A check valve 52, vacuum tank 53, T-shaped connector 54 and throttle valve 55 are successively interposed in auxiliary line 48 between the connectors 44 and 46. A lever 56 connects to and controls the normally closed throttle valve 55. This lever is connected to the engine throttle of the automobile for operation thereby to open the valve 55 only at full throttle and for purposes to be further described herein.

A line 57 connects to the connector 54 to one end and couples to the rod 27 at its other end to provide direct communication between the vacuum tank 53 and the passage 29 in rod 27 at all times.

Each of the lines indicated is provided by a small bore flexible tubing.

A system is thus provided which offers automatic emergency braking in the following manner. When the ignition switch in the automobile is turned on and the engine started, a vacuum is naturally created in the manifold M, main vacuum line 43 and auxiliary line 48 between the manifold and the throttle 55 which is closed. A vacuum is also established in the passage 29 in rod 27 through the line 57. The vacuum in line 43 operates on the diaphragm 34 in housing 26 against the bias of the spring 39 to pull the diaphragm towards the chamber 36. This draws rod 40 inwardly of the housing 26 to the position shown in FIG. 2 of the drawings to correspondingly move rod 27 outwardly of the tubular rod 5 sufficiently to position the opening 30 from passage 29 in rod 27 in direct communication with slot 9 in rod 5 within the chamber 7 of housing 3. A vacuum is thus established in chamber 7. At the same time an opening 33 from passage 31 in rod 27 aligns with the slot 10 in rod 5 disposed in the chamber 6 to provide atmospheric pressure in chamber 6. The above results in a sharp projection of tubular rod 5 outwardly of the housing 3 to the position shown in FIG. 2. Rod 27 moves with rod 5 since it is operatively connected for movement therewith through the medium of housing 26 and rods 40 and 41. The pivot pin 13 is moved thereby to pivot the lever 17 counter-clockwise to the position illustrated in FIG. 2 sufficient to position the over-center spring 42 to the left of pivot 13. In this over-center position the spring 42 will maintain the lever 17 as shown in FIG. 2 of the drawings to fix it and control rod 23 in a brake release position.

In the event that the engine of the automobile is run at full throttle, the vacuum established in the intake manifold is substantially reduced and the throttle valve lever 56 is automatically actuated at this time through suitable controls to open the valve 55. Prior thereto a substantial vacuum has been established in the tank 53. As valve 55 is opened, the tank 53 is thereby switched into the main vacuum vacuum line at the connector 46 to automatically maintain the vacuum on the diaphragm 34 without interruption and maintain the brake release position of the lever 17 thereby. The check valve 52 prevents loss of vacuum at the tank as the vacuum fails in the manifold M.

On cutting the engine by turning off the ignition switch, vacuum is automatically lost at the manifold M and the throttle valve 55 is automatically closed to shut off the auxiliary vacuum line between the tank 53 and the main line 43. As this occurs, and there is a loss of vacuum in housing 26 sufficient to permit the spring 39 to shove diaphragm 34 to project rod 40 and move the rod 27 thereby inwardly of tubular rod 5. The movement of the rod 27 relative the rod 5 is sufficient to position the opening 30 in alignment with the slot 9 in tubular rod 5 to the side of the piston 4 within the chamber 6 of the housing 3. Due to the continuous connection of the tank 53 with the passage 29 and rod 27, a vacuum is created in the chamber 6 through the aligned opening 30 and slot 9. At the same time the other opening 33 in rod 27 aligns with slot 10 in rod 5 within chamber 7 to provide atmospheric pressure therein. This causes the piston 4 to be drawn into the housing 3 against the bias of the spring 8. The tubular rod 5 and rod 27 are conjointly moved thereby inwardly of the housing 3 to pivot the lever 17 about the pin 16 through the medium of the pin 13 sufficiently for the spring 42 to be displaced right of center with respect to the pin 13. In the process, the control rod 23 operates brake cables connected to fix the emergency brake in a locked position. Due to the fact the over-center spring 42 has been displaced right of center, this brake condition will be maintained until further movement of the rod 5 in an opposite direction.

The emergency brake may be released by starting the engine once more to apply a vacuum in the manifold M and obtain the displacement of the system components as previously described to the position shown in FIG. 2 of the drawings. The cable 24 is provided so that it may be used for manual release of the emergency brake in the event it is necessary for the automobile to be towed. The cable 24 operates the system to a release condition by an obvious pivot of the lever 17 to displace the spring 42 over-center with respect to the pin 13 to the position shown in FIG. 2 of the drawings.

The valve 47 provides a further medium for opening the main vacuum line 43 and causing automatic emergency braking action. Reference is made to FIG. 3 of the drawings which shows a preferred manner of its incorporation. Here the valve 47 is shown mounted to depend from the floor board F of the automobile directly under the conventional brake pedal P. The valve 47 includes a housing 60 connected at one end to depend from the floor board. The housing 60 contains a piston 61 having a rod 62 connected to project from the housing through suitable seals and up through the floor board F in the path of movement of the brake pedal B. A spring 63 between the piston 61 and the dependent end of housing 60 normally biases the rod 62 upwardly of the floor board. The piston normally defines separate chambers 64 and 65 in housing 60 respectively to the upper and lower ends thereof. The chamber 64 has a small aperture 66 venting it to the atmosphere.

The lower end of the housing 60 is interposed in the main vacuum line 43 between the connector 46 and housing 26, as indicated, through an opening in its dependent extremity and another into the chamber 65 at its side. When the engine of the automobile is in operation and emergency brakes are necessary, on full depression of the brake pedal the rod 62 will be engaged thereby to depress the piston 61 to close the communication between the openings into the chamber 65. This will place the opening into the side of chamber 65 in direct communication with the atmosphere through the vent opening in the chamber 64. As a result there will be a loss of vacuum in the housing 26 and corresponding displacement of the system apparatus to a braking position in a manner as previously described.

Thus it may be seen that a very simple and effective automatic emergency braking system may be provided in accordance with the invention in an ordinary automobile or similarly constituted vehicle. The system is quite economical and requires no special equipment for incorporation.

The apparatus of the invention system is so related to minimize the human factor and provide a braking action which is immediate and positive in character. As shown, in the instance of the system being applied to an ordinary automobile, it provides immediate and positive braking on turning off the ignition switch or in any instance engine operation is interrupted. A modification of the invention illustrated affords a supplemental automatic emergency braking means with respect to the conventional brake system in an automobile in a manner to make the automobile safer to operate and more efficient and effective with respect to its brake system at all times.

As is obvious, the invention system, while particularly applicable to vehicles, may be applied to any power driven unit where brakes are essential.

From the above description it will be apparent there is thus provided a device of the character described possessing the particular features of advantage before enumerated as desirable, but which obviously is susceptible of modification in its form, proportions, detail construction, and arrangement of parts without departing from the principle involved or sacrificing any of its advantages.

While in order to comply with this statute the invention has been described in language more or less specific as to structural features, it is to be understood that the invention is not limited to the specific features shown but that the means and construction herein disclosed comprise but one of several modes of putting the invention into effect, and the invention is therefore claimed in any of its forms or modifications within the legitimate and valid scope of the appended claims.

Having thus described my invention, I claim:

1. An automatic control system for emergency brakes comprising, means defining a main vacuum line, means connected in said main line defining an auxiliary line, means for producing a vacuum in said lines, normally closed valve means in said auxiliary line, means in said auxiliary line to maintain a vacuum therein on subsequent failure of said vacuum producing means to do so, brake control means having a braking and a brake release position, said brake control means respectively having, on the one hand, an operative connection to said main line and the means maintaining a vacuum in said auxiliary line, and, on the other hand, an operative connection to the emergency brakes and being arranged thereby to automatically respond to a predetermined vacuum condition in said main and auxiliary lines to assume a brake release position and means in connection with said normally closed valve means having an operative connection to said vacuum producing means and arranged thereby to open said valve means to maintain the vacuum in said main line sufficient to cause the control means to be retained in a brake release position on a predetermined failure of the vacuum producing means to do so.

2. Control apparatus for emergency brakes comprising a control element for engagement with the brakes for the selective movement thereof to a braking or a brake release position, a main vacuum line, a secondary vacuum line, means operatively related to simultaneously produce a predetermined vacuum level in both said lines, brake activator means having, on the one hand, an operative connection to said control element and, on the other hand, an operative connection to said main and secondary vacuum lines to respond to a predetermined vacuum level in said respective lines to place said control element in a brake release position and to respond to a relative failure of the said vacuum in said main line to maintain its level to automatically move said element to a brake engaging position.

3. Brake control apparatus for a unit including brake means, which unit is powered by an internal combustion engine, comprising support means, a lever means pivoted at one end to said support means, means extending from adjacent the opposite end of said lever means for connection to said brake means and operable on selective pivoting of said lever means to place said brake means in an engaged or a released position, a housing having one end connected to said support means, a piston means slidable in said housing in transversely bridging relation thereto, a rod means in connection with said piston means, said rod means bearing in and projecting from said housing to pivotally connect to an intermediate portion of said lever means and means for operatively relating the engine to said rod and piston means to produce thereby, on starting said engine, a positioning of said piston means in said housing which rocks said lever means to position the brake means in a released condition and, on interruption of the operation of said engine, a conditioning of said rod and piston means to rock said lever means to place said brake means in a braked condition.

4. Apparatus for controlling brakes comprising support means, lever means one end of which is pivoted to said support means, a control element extending from the opposite end of said lever means for connection to said brakes, a housing resiliently connected at one end to said support means, a piston means forming two chambers within said housing having a connected rod assembly which projects therefrom to pivotally connect to an intermediate portion of said lever means, further means in connection with said rod assembly for selectively applying a vacuum in said chambers to respectively induce a movement of said piston means in said housing, in one instance to rock said lever means to cause the control element to release the brakes and in the other instance to rock said lever means to cause said control element to engage said brakes, and means interconnected between said support and lever means operating to fix the lever means against inadvertent displacement either when it causes said control element to place the brake means in a released condition or an engaged condition.

5. In a unit driven by an internal combustion engine, which unit includes brake means, control means for operative engagement with the brake means, means for connecting said control means to the intake manifold of the engine and applying to said control means the vacuum resulting in said manifold from the operation of the engine in a manner to establish the brake means in a released condition, said control means and connecting means including portions operating on the failure of vacuum in the intake manifold of said engine to induce said control means to adjust and effect an engaged position of said brake means, said connecting means including a portion thereof operable, on the achievement of a predetermined operating condition of said engine which results in a failure of the vacuum in its intake manifold, to maintain a proper vacuum in application to said control means and thereby maintain the brakes in a released condition.

6. Control apparatus for the emergency brakes in a powered vehicle including a control element for moving the brakes to either a braked or a released condition, a main vacuum line, a second vacuum line, a control assembly including a piston operatively connected to said control element, and means operatively relating said piston to said vacuum lines and conditioning said piston, in response to a predetermined vacuum in said line on vehicle operation, to move said control element to a position to release the brakes.

7. A device as set forth in claim 6 characterized by means in connection with said main line for venting said line to the atmosphere during operation of the vehicle whereby to interrupt a portion of the vacuum applied to the control assembly, said means operatively relating said piston to said vacuum lines being rendered operative thereby to cause said control element to responsively move said brake means to an engaged condition.

8. In a unit driven by an internal combustion engine having brake means, brake operator means for positioning the brake means in a released or engaged condition, pressure sensitive control means operatively connected to said operator means, means connecting said control means to the intake manifold of the internal combustion engine and providing, on operation of the engine, an application of vacuum to said control means as a result of which said operator means causes said brake means to assume a released condition, said control means being arranged on failure of vacuum in the manifold to induce said operator means to cause said brake means to achieve an engaged position and means in connection with said operator means to maintain said operator means against inadvertent displacement from the position assumed when the brakes are either engaged or released.

9. Control apparatus for the brakes in a unit powered by an internal combustion engine, operation of which produces a vacuum in its intake manifold, comprising means for connection with said brakes operable to selectively move said brakes to an engaged or released condition, pressure sensitive means, means operatively relating said pressure sensitive means to said brake moving means, and means providing, on the occurrence of a vacuum in said intake manifold, an application of the vacuum to said pressure sensitive means in a sense to produce therethrough a movement of said brake moving means to release said brakes and further providing on failure of the vacuum in said manifold, an application of vacuum to said pressure sensitive means in a reverse sense whereby to produce therethrough a movement of said brake moving means to provide an engagement of said brakes.

10. An automatic brake system for use on brake means in a power driven unit having means in connection therewith providing a vacuum on energizing thereof comprising, support means, lever means pivoted adjacent one end thereof to said support means, means in connection with said lever means and extending therefrom for connection to said brake means, and means having an operative connection to said lever means arranged to selectively rock said lever means, and means for communicating the produced vacuum with said rocking means to render said rocking means operable to automatically position said lever means in a brake released position on energizing of said unit and in a brake engaged position on deenergizing of said unit.

11. Control apparatus for use on the brakes of a unit powered by an internal combustion engine comprising, pressure sensitive control means having means in connection therewith for engagement to the brakes, means including vacuum storage means operatively relating said control means to the intake manifold of the internal combustion engine in a manner whereby on operation of the engine the vacuum produced thereby will be automatically applied to said control means in one sense to cause the means in connection therewith to automatically and directly establish the brakes in a released condition, said control means being arranged to respond to a failure of vacuum in the intake manifold of the internal combustion engine and a transmission of vacuum from said storage means in a sense to cause the means in connection therewith to automatically establish the brakes in an engaged condition.

12. Control apparatus for the brakes in a power driven unit having means in connection therewith producing, on energization thereof, a vacuum, comprising operator means for connection with said brakes, control means including pressure sensitive elements connected to automatically and directly respond to the vacuum produced on operation of said power driven unit to induce said operator means to assume a brake released condition and to directly and automatically cause said operator means to assume a brake engaged condition in response to an interruption of the operation of the power driven unit which produces a failure of said vacuum and means included in said control means for disabling thereof during the production of vacuum by said power driven unit in a manner to cause the brake operator means to produce an engagement of said brakes.

13. Control apparatus for emergency brakes comprising a control element for engagement with the brakes for selective movement thereof to a braking or a brake release position, a main vacuum line, means for producing a predetermined vacuum level in said main line, brake activator means having, on the one hand, an operative connection to said control element and, on the other hand, an operative connection to said main line to respond to a predetermined vacuum level in said line to place said control element in a brake released position and to respond to a failure of said vacuum in said main line to maintain its level to automatically move said element to a brake engaging position, an auxiliary vacuum line in communication with said vacuum producing means providing a vacuum storage line and means interconnecting said vacuum storage line with a portion of said activator means to provide for the selective achievement of the braking or brake released position of said brakes.

References Cited by the Examiner

UNITED STATES PATENTS

| | | | |
|---|---|---|---|
| 1,867,078 | 7/1932 | Kazenmaire | 188—170 |
| 1,932,649 | 10/1933 | Trachsel | 188—170 X |
| 2,409,908 | 10/1946 | Simpkins | 188—170 X |
| 2,440,928 | 5/1948 | Bower | 74—100 X |
| 2,986,164 | 5/1961 | Dansel | 188—170 X |
| 3,101,133 | 8/1963 | House et al. | 188—170 |

DAVID J. WILLIAMOWSKY, *Primary Examiner.*

DON A. WAITE, BROUGHTON DURHAM,
*Examiners.*